April 24, 1945.  W. D. FUGLER  2,374,279
FISH LURE
Filed April 6, 1944
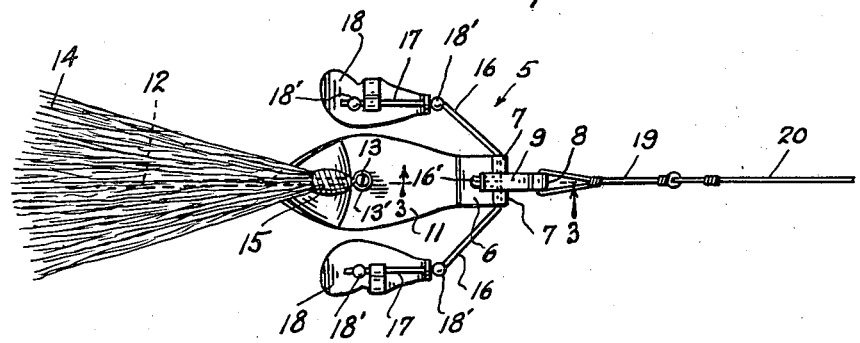
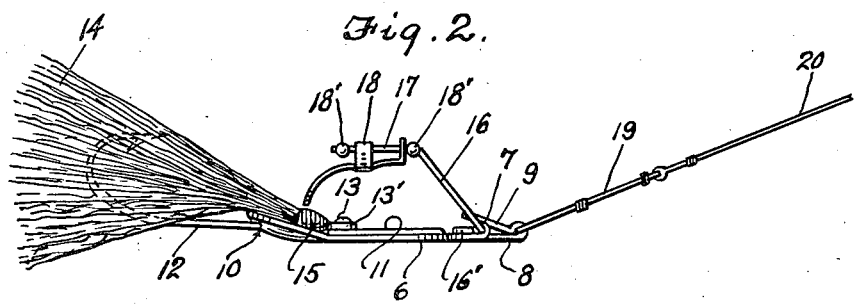
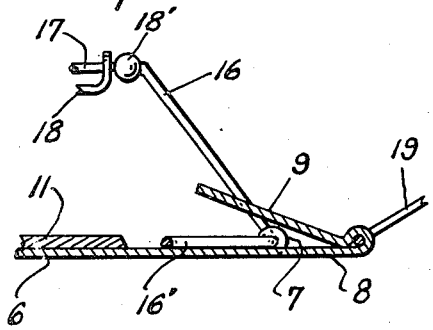
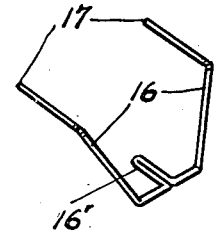
Inventor
Wilbur D. Fugler
By L. B. James
Attorney Patented Apr. 24, 1945

2,374,279

UNITED STATES PATENT OFFICE 2,374,279

FISH LURE

Wilbur Douglas Fugler, Baton Rouge, La.

Application April 6, 1944, Serial No. 529,779

3 Claims. (Cl. 43—45)

This invention relates to the official class of fishing and trapping and more particularly to fishing lures.

The primary object of this invention resides in the provision of a fishing lure adapted to simulate live bait in catching black bass, trout and other large mouth game fish.

Another object of this invention resides in the particular construction of the body portion of the lure.

A further object of this invention resides in the particular construction of the hinged arms and mounting thereof on the body portion of the lure.

A still further object of this invention resides in the particular construction of the spinning blades and mounting thereof on the hinged arms.

Aside from the foregoing objects this invention resides in the particular construction and manner of securing the hook concealing tail on the body portion of the lure.

Among the salient features of this invention is the provision of means controlling the swinging movement of the hinged arms.

With these and other objects in view, this invention resides in certain novel features of construction and arrangements of elements to be hereinafter more particularly set forth in the specification, illustrated in the accompanying drawing and pointed out in the appended claims and, while this disclosure depicts my present conception of the invention, the right is reserved to resort to such changes in construction and arrangement of elements as come within the spirit of the invention.

In the accompanying drawing forming a part of this application:

Fig. 1 is a plan view of the fishing lure.

Fig. 2 is a side view thereof.

Fig. 3 is a section view approximately on line 3—3 of Fig. 1.

Fig. 4 is a detailed perspective view of the hinged arms per se.

In the present illustration of this invention the numeral 5 designates, in general, a fishing lure designed to simulate live bait used in catching black bass, trout and other large mouth game fish and consists of a substantially spoon-shape body portion 6 having spaced trunnions 7 at its front end and a forwardly extending tongue 8 which is looped upon itself and extended rearwardly between said trunnion to form an upwardly directed lug 9 for a purpose to be hereinafter set forth.

Extending rearwardly through an aperture 10 in the rear of the body portion is the shank of a suitable hook 12 and in order to secure the shank of the hook to the body portion, a screw 13 or other suitable element is extended through an eye 13' on the shank and fastened to the body portion.

Suitably secured to the shank of the hook as indicated by the numeral 15 and preferably adjacent its secured forward end, is a hook concealing tail 14 which is formed of bucktail or other material capable of hiding the point of the hook and yet permitting it to perform its usual function in catching fish.

Swingably mounted in the aforesaid trunnions 7 of the body portion of the lure are upwardly and outwardly extending arms 16 having axle portions 17 extending rearwardly to rotatably carry fin-shape spinners 18, said axle portions extending through apertures in the forward ends of the spinners and bearing lugs spaced therefrom to permit smooth rotation of the spinners thereon, it being apparent the spinners are retained on the axle portions by suitable heads 18' or the like molded thereon.

In order to limit the swinging action of the arms 16, relative to the body portion of the lure, a stop lug 16' is formed on or otherwise secured to the arms 16 thereof so as to rock between the trunnions 7 and contact the upper side of the body portion upon the arms 16 reaching their full rearward movement, while on the other hand, said stop lug 16' will contact the lug 9 to limit the forward movement of said arms. Through the instrumentality of the aforesaid elements swinging movement of the arms ranges from forty-five to approximately ninety degrees relative to the body portion of the lure, however, it is to be understood said arcuate movement of the arms may be varied at the option of the manufacturer if found necessary.

Journalled in the looped portion of the tongue 8 is a suitably constructed lead-wire 19 of such length and size that fouling of the line 20 in the spinners is prevented when casting.

In the present illustration of the lure the body portion thereof is provided on its upper surface with a weighted area 11 so the lure can be used for under water bait and, where the same is to be used as surface bait, the body portion retains its general shape but is of greater length than the under water style and is devoid of the weighted area, attention being directed to the fact the lure is to be manufactured of any suitable material and decorated in such manner as to meet the demands required to attract different species of fish.

Through the instrumentality of the particularly constructed body portion of the lure, it will ride in an upright position when in the water.

Having thus described my invention what I claim and desire to protect by Letters Patent is:

1. In a fishing lure, the combination of a hook carrying body of substantially spoon-shape, swingable arms journalled on the forward end of the body and having axle portions extending rearwardly from their lower ends, spinners rotatably mounted on said axle portions, means on said body and swingable arms to limit their arcuate movement, a lead-wire secured to the front end of the body, a line secured to the lead-wire, and a hook concealing tail carried by the shank of the hook with its free portions surrounding the point thereof.

2. In a fishing lure, the combination of a hook carrying body of substantially spoon-shape and having a weighted area, swingable arms journalled on the forward end of the body and having substantially horizontal axle portions extending rearwardly from their lower ends, spinners rotatably journalled on said axle portions, means on said body and swingable arms to limit their arcuate swinging movement, a lead-wire secured to the front end of the body, a line secured to the lead-wire, and a hook concealing tail secured to the shank of the hook and having its free portions surrounding the point of the hook.

3. In a fishing lure comprising a substantially spoon-shape body having an aperture in its rear end, a hook having its shank extending through said aperture, means securing the forward end of the shank to the body, spaced trunnions on the forward end of the body, a forwardly extending tongue formed on the body and looped upon itself, a rearwardly and upwardly directed lug extended from the looped portion of the tongue, upwardly and outwardly extending arms journalled in said trunion and having axle portions extending rearwardly, spinners journalled on said axle portions of said arms, a stop lug formed on said arms and operable between the upper side of the body and said first lug, a lead-wire journalled in the looped portion of the tongue, a line secured to the free end of the lead-wire, and a fibrouse tail secured to the shank of the hook with its free portions concealing the point thereof.

WILBUR DOUGLAS FUGLER.